(12) United States Patent
Peri

(10) Patent No.: US 10,698,068 B2
(45) Date of Patent: Jun. 30, 2020

(54) SYSTEM AND METHOD FOR SYNCHRONIZING TRACKING POINTS

(71) Applicant: Samsung Electronics Co., Ltd., Suwon-si (KR)

(72) Inventor: Christopher Peri, Mountain View, CA (US)

(*) Notice: Subject to any disclaimer, the term of this patent is extended or adjusted under 35 U.S.C. 154(b) by 85 days.

(21) Appl. No.: 15/881,378

(22) Filed: Jan. 26, 2018

(65) Prior Publication Data

US 2018/0275242 A1 Sep. 27, 2018

Related U.S. Application Data

(60) Provisional application No. 62/476,366, filed on Mar. 24, 2017, provisional application No. 62/515,442, (Continued)

(51) Int. Cl.
*G06T 7/00* (2017.01)
*G01S 3/786* (2006.01)
(Continued)

(52) U.S. Cl.
CPC ............ *G01S 3/7864* (2013.01); *G06F 1/163* (2013.01); *G06F 3/011* (2013.01); *G06F 3/012* (2013.01);
(Continued)

(58) Field of Classification Search
CPC ................ G06F 3/00; H04N 5/00; G06T 7/00
(Continued)

(56) References Cited

U.S. PATENT DOCUMENTS 9,024,972 B1 5/2015 Bronder et al.
9,459,692 B1 10/2016 Li
(Continued)

FOREIGN PATENT DOCUMENTS

CN 104714650 A 6/2015
CN 106247951 A 12/2016
(Continued)

OTHER PUBLICATIONS

International Search Report and Written Opinion regarding Application No. PCT/KR2018/002752, dated Aug. 21, 2018, 14 pages.
(Continued)

*Primary Examiner* — Abolfazl Tabatabai

(57) ABSTRACT

An electronic device, method, and computer readable medium for synchronizing frame-based and event-based tracking points are provided. The electronic device includes a frame-based camera, an event-based camera, and a processor. The processor is coupled to the frame-based camera and the event-based camera. The processor receives frame-based data captured by the frame-based camera and event-based data captured by the event-based camera; identifies a frame-based tracking point from the frame-based data; identifies an event-based tracking point from the event-based data corresponding to the frame-based tracking point; and synchronize the frame-based camera and the event-based camera based on the identified frame-based tracking point and the identified event-based tracking point.

25 Claims, 9 Drawing Sheets

Related U.S. Application Data filed on Jun. 5, 2017, provisional application No. 62/517,850, filed on Jun. 9, 2017.

(51) Int. Cl.

| | |
|---|---|
| *G06T 7/292* | (2017.01) |
| *H04N 5/04* | (2006.01) |
| *G06F 3/01* | (2006.01) |
| *H04N 5/247* | (2006.01) |
| *G06F 3/0346* | (2013.01) |
| *G06F 3/038* | (2013.01) |
| *G06F 1/16* | (2006.01) |
| *G06F 3/03* | (2006.01) |
| *G06T 7/246* | (2017.01) |
| *G06F 3/00* | (2006.01) |
| *H04N 5/232* | (2006.01) |

(52) U.S. Cl.
CPC ............ *G06F 3/0304* (2013.01); *G06F 3/038* (2013.01); *G06F 3/0317* (2013.01); *G06F 3/0346* (2013.01); *G06T 7/246* (2017.01); *G06T 7/292* (2017.01); *H04N 5/04* (2013.01); *H04N 5/247* (2013.01); *G06T 2207/10016* (2013.01); *G06T 2207/30208* (2013.01); *H04N 5/232* (2013.01)

(58) Field of Classification Search
USPC .......................................... 382/103; 348/169
See application file for complete search history.

(56) References Cited

U.S. PATENT DOCUMENTS

| | | | |
|---|---|---|---|
| 9,514,571 B2* | 12/2016 | Williams | .............. G06T 19/006 |
| 9,529,426 B2* | 12/2016 | Liu | ........................... G06F 3/012 |
| 9,551,873 B2 | 1/2017 | Zalewski | |
| 9,665,777 B2* | 5/2017 | Naikal | ................... H04N 7/181 |
| 2008/0068336 A1 | 3/2008 | Choi et al. | |
| 2008/0120056 A1 | 5/2008 | Haino et al. | |
| 2010/0231692 A1 | 9/2010 | Perlman et al. | |
| 2011/0050944 A1 | 3/2011 | Nakamura et al. | |
| 2011/0229012 A1 | 9/2011 | Singhal | |
| 2013/0129304 A1 | 5/2013 | Feinson | |
| 2014/0218483 A1 | 8/2014 | Wang et al. | |
| 2014/0267799 A1 | 9/2014 | Sadasivam et al. | |
| 2014/0368712 A1 | 12/2014 | Park et al. | |
| 2015/0022869 A1 | 1/2015 | Shi et al. | |
| 2015/0109200 A1 | 4/2015 | Lee et al. | |
| 2015/0181197 A1 | 6/2015 | Baldwin | |
| 2015/0248551 A1 | 9/2015 | Bae et al. | |
| 2015/0317834 A1 | 11/2015 | Poulos et al. | |
| 2016/0034770 A1 | 2/2016 | Peterson et al. | |
| 2016/0140731 A1 | 5/2016 | Lee et al. | |
| 2016/0147063 A1 | 5/2016 | Border et al. | |
| 2016/0260251 A1 | 9/2016 | Stafford et al. | |
| 2016/0262608 A1 | 9/2016 | Krueger | |
| 2016/0320951 A1 | 11/2016 | Ernst et al. | |
| 2017/0078653 A1 | 3/2017 | Bi et al. | |
| 2017/0102772 A1 | 4/2017 | Hesch et al. | |
| 2017/0128020 A1 | 5/2017 | Olivier et al. | |
| 2017/0132794 A1 | 5/2017 | Lee et al. | |
| 2017/0134694 A1 | 5/2017 | Cho et al. | |
| 2018/0278916 A1 | 9/2018 | Kim et al. | |

FOREIGN PATENT DOCUMENTS

| | | |
|---|---|---|
| EP | 3334156 A1 | 6/2018 |
| JP | 2005309777 A | 11/2005 |
| JP | 3876275 B2 | 1/2007 |
| JP | 2015073191 A | 4/2015 |
| JP | 20170097122 A | 6/2017 |
| KR | 101665027 B1 | 10/2016 |
| KR | 10-2017-0017700 A | 2/2017 |
| KR | 20170026802 A | 3/2017 |
| WO | 2017026705 A1 | 2/2017 |

OTHER PUBLICATIONS

Censi et al., "Low-Latency Event-Based Visual Odometry", 2014 IEEE International Conference on Robotics and Automation (ICRA), May 2014, 8 pages.
Benosman et al., "Event-Based Visual Flow", IEEE Transactions on Neural Networks and Learning Systems, vol. 25, No. 2, Feb. 2014, pp. 407-417.
Weikersdorfer et al., "Event-based Particle Filtering for Robot Self-Localization", 2012 IEEE International Conference on Robotics and Biomimetics (ROBIO), Dec. 2012, 5 pages.
International Search Report and Written Opinion regarding Application No. PCT/KR2018/003252, dated Jul. 12, 2018, 11 pages.
Supplementary European Search Report in connection with European Application No. 18771223.7 dated Jan. 8, 2020, 8 pages.
Supplementary Partial European Search Report in connection with European Application No. 18771400.1 dated Nov. 25, 2019, 47 pages.
Censi, Andrea, et al, "Low-Latency Event-Based Visual Odometry," 2014 IEEE International Conference on Robotics & Automation (ICRA), Hong Kong, China, May 31-Jun. 7, 2014, 8 pages.
Pathak, Sarthak, et al, "Dense 3D Reconstruction from Two Spherical Images via Optical Flow-based Equirectangular Epipolar Rectification," 2016 IEEE International Conference on Imaging Systems and Techniques (IST), IEEE, Oct. 4, 2016, 6 pages.

* cited by examiner

SYSTEM AND METHOD FOR SYNCHRONIZING TRACKING POINTS

CROSS-REFERENCE TO RELATED APPLICATION AND CLAIM OF PRIORITY

This application claims priority under 35 U.S.C. § 119(e) to U.S. Provisional Patent Application No. 62/476,366 filed on Mar. 24, 2017, titled "SYSTEM AND METHOD FOR DEPTH MAP CREATION." This application also claims priority under 35 U.S.C. § 119(e) to U.S. Provisional Patent Application No. 62/515,442 filed on Jun. 5, 2017, titled "System and method for Camera Switching." This application also claims priority under 35 U.S.C. § 119(e) to U.S. Provisional Patent Application No. 62/517,850 filed on Jun. 9, 2017, titled "System and Method for Power Optimization with Intermittent Optical Tracking." The above-identified provisional patent applications are hereby incorporated by reference in their entirety.

TECHNICAL FIELD

This disclosure relates generally to systems for synchronizing different types of cameras. More specifically, this disclosure relates to systems and methods for synchronizing frame-based and event-based tracking points.

BACKGROUND

Determining visual tracking points for frame-based cameras are known. Similarly, determining visual tracking points for event-based cameras are also known. However, the visual tracking points from frame-based cameras compared to event-based cameras are typically different points due to the nature of the camera types. Systems and methods for determining improved tracking points are needed.

In one embodiment, an electronic device provides for synchronizing frame-based and event-based tracking points. The electronic device includes a frame-based camera, an event-based camera, and a processor. The processor is coupled to the frame-based camera and the event-based camera. The processor receives frame-based data captured by the frame-based camera and event-based data captured by the event-based camera; identifies a frame-based tracking point from the frame-based data; identifies an event-based tracking point from the event-based data corresponding to the frame-based tracking point; and synchronize the frame-based camera and the event-based camera based on the identified frame-based tracking point and the identified event-based tracking point.

In a second embodiment, a method provides for synchronizing frame-based and event-based tracking points. The method includes receiving frame-based data captured by a frame-based camera and event-based data captured by an event-based camera; identifying a frame-based tracking point from the frame-based data; identifying an event-based tracking point from the event-based data corresponding to the frame-based tracking point; and synchronizing the frame-based camera and the event-based camera based on the identified frame-based tracking point and the identified event-based tracking point.

In a third embodiment, a non-transitory medium embodying a computer program provides for synchronizing frame-based and event-based tracking points. The program code, when executed by at least one processor, causes a processor to receive frame-based data captured by a frame-based camera and event-based data captured by an event-based camera; identify a frame-based tracking point from the frame-based data; identify an event-based tracking point from the event-based data corresponding to the frame-based tracking point; and synchronize the frame-based camera and the event-based camera based on the identified frame-based tracking point and the identified event-based tracking point.

In a fourth embodiment, a head mounted display (HMD) provides for synchronizing frame-based and event-based tracking points. The HMD includes an inertial motion unit (IMU), at least one optical sensor, and a processor. The IMU generates motion data based on an HMD movement. The processor is coupled to the IMU and the at least one optical sensor. The processor executes instructions to receive data from the IMU; receive low resolution data and high resolution data at different framerates from the at least one optical sensor; check whether data is available from a more precise source for each data point received; update an offset for a less precise data source based on the more precise source when available; and determine pose based on the updated offset.

In a fifth embodiment, an HMD provides for synchronizing frame-based and event-based tracking points. The HMD includes an inertial motion unit (IMU), at least one outward facing optical sensor, and a processor. The IMU is configured to generate motion data based on an HMD movement. The at least one outward facing optical sensor is coupled to the HMD. The processor is coupled to the IMU and the at least one optical sensor. The processor executes instructions to receive motion data from the IMU; determine rate of pose change of the HMD based on the received motion data; and adjust an optical tracking rate from the outward facing optical sensor based on the determined rate of pose change.

In a sixth embodiment, an HMD provides for synchronizing frame-based and event-based tracking points. The HMD includes an outward facing frame-based camera, an outward facing event-based camera, an inertial motion unit (IMU) and a processor. The frame-based camera is coupled to the HMD. The event-based camera is coupled to the HMD in proximity to the frame-based camera. The IMU generates motion data based on an HMD movement. The processor is coupled to the frame-based camera, the event-based camera, and the IMU. The processor executes instructions to receive motion data from the IMU; select at least one of the frame-based camera or the event-based camera based on the motion data; receive image data from the selected camera; and process received image data to determine an HMD orientation.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
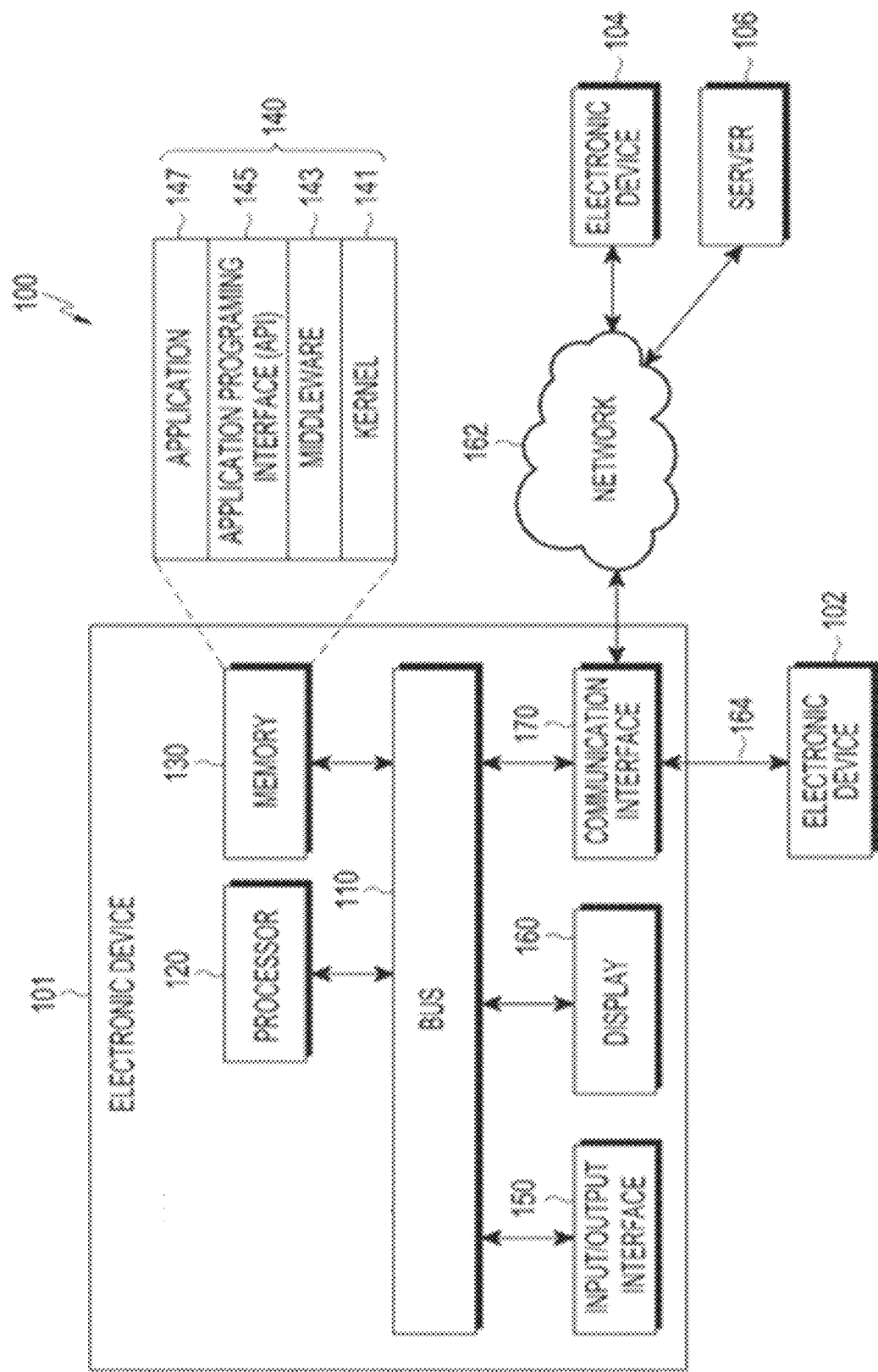
FIG. 1 illustrates an example network configuration according to embodiments of the present disclosure.

FIGS. 1 through 12, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Various embodiments of the present disclosure provide for allowing synchronicity between at least two differing camera types by ensuring each is tracking the same points by identifying and classifying elements in one camera that can be reliably employed as a match to patterns tracked in another camera. Various embodiments of the present disclosure also provide for identifying a number of tracking points from one camera (e.g., an RGB camera) and recording information about each point (e.g., x,y position, ID, and point marker, etc.). Further embodiments of the present disclosure provides for locating corresponding points (e.g., x,y point) in an image gleaned from another camera (e.g., a DVS camera) at a corresponding timestamp; analyzing, at each point, the output of the second camera and rank tracking quality; and tracking a highest ranked points as long as the tracking points from the first camera are used. Example factors can include: stability of the reported event, clarity (meaning clear and consistent shape) and lack of neighboring points that can cause confusion.

While embodiments may be described in relation to RGB and DVS optical sensors or cameras, the embodiments are applicable to any frame-based or event-based optical sensors or cameras.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 may include at least one of a bus 110, a processor 120, a memory 130, an input/output (IO) interface 150, a display 160, or a communication interface 170. In some embodiments, the electronic device 101 may exclude at least one of the components or may add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 of the VR client 10 can receive frame-based data captured by the frame-based camera and event-based data captured by the event-based camera. The processor 120 can identify a frame-based tracking point from the frame-based data. The processor 120 can identify an event-based tracking point from the event-based data corresponding to the frame-based tracking point. The processor 120 can synchronize the frame-based camera and the event-based camera based on the identified frame-based tracking point and the identified event-based tracking point.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocation the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 133 includes at least one interface or function (e.g., a command) for filing control, window control, image processing or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (Wi-Bro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example.

Although FIG. 1 shows that the electronic device 101 includes the communication interface 170 to communicate with the external electronic device 104 or server 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
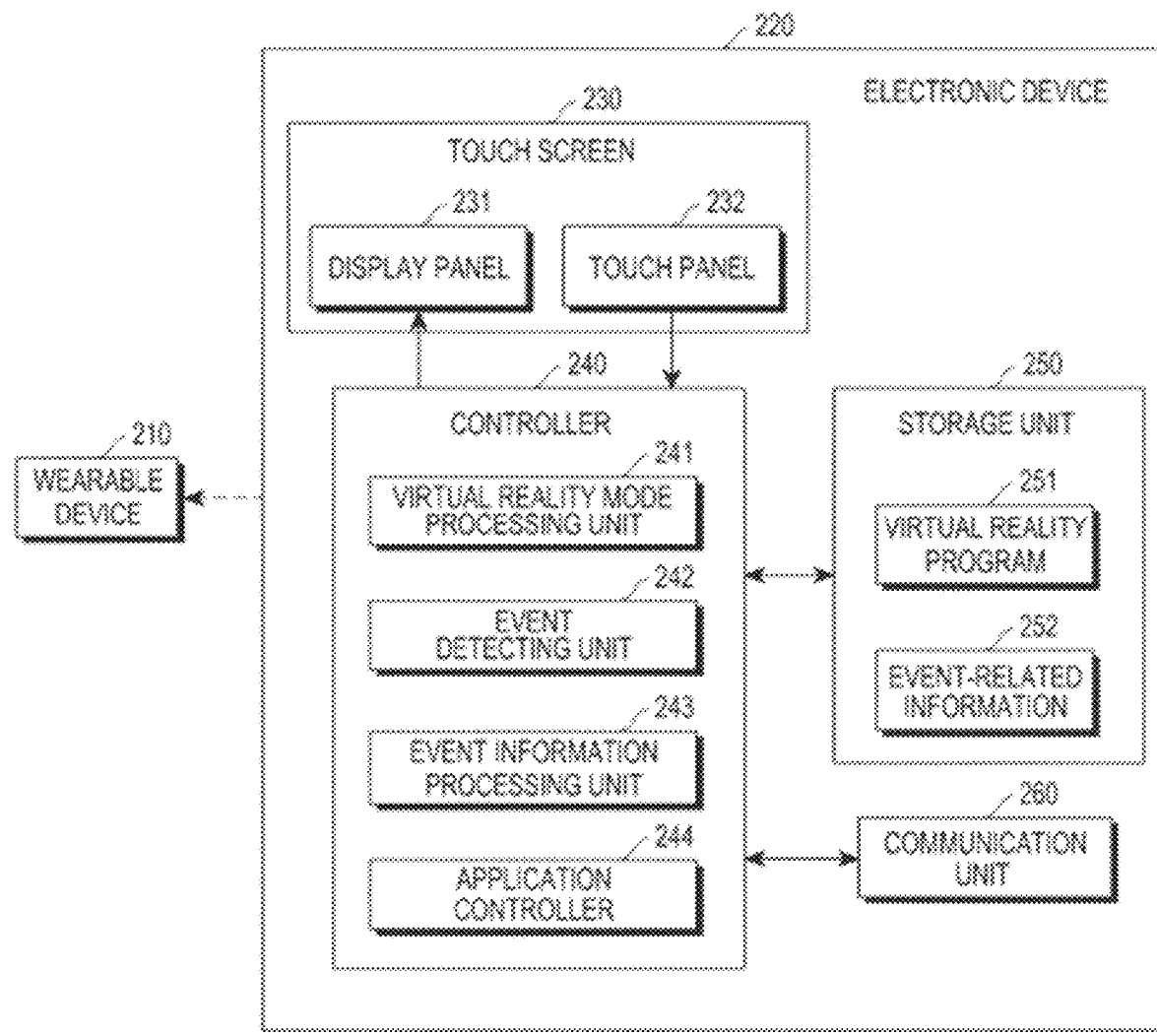
FIG. 2 is a block diagram illustrating an exemplary configuration of an electronic device according to various embodiments of the present disclosure.

FIG. 2 is a block diagram illustrating an exemplary configuration of an electronic device 220 according to various embodiments of the present disclosure. The embodiment of the electronic device 220 shown in FIG. 2 is for illustration only. Other embodiments of the electronic device 220 could be used without departing from the scope of this disclosure.

Referring to FIG. 2, the electronic device 220 according to an embodiment of the present disclosure may be an electronic device 220 having at least one display means. In the following description, the electronic device 220 may be a device primarily performing a display function or may denote a normal electronic device including at least one display means. For example, the electronic device 220 may be an electronic device (e.g., a smartphone) having a touchscreen 230.

According to an embodiment of the present disclosure, the electronic device 220 includes at least one of a touchscreen 230, a controller 240, a storage unit 250, or a communication unit 260. The touchscreen 230 can include a display panel 231 and/or a touch panel 232. The controller 240 can include at least one of a virtual reality mode processing unit 241, an event determining unit 242, an event information processing unit 243, or an application controller 244.

For example, when the electronic device 220 is mounted in a wearable device 210, the electronic device 220 may operate, for example, as an HMD, and run a virtual reality mode. Further, according to an embodiment of the present disclosure, even when the electronic device 220 is not mounted in the wearable device 210, the electronic device 220 may run the virtual reality mode according to the user's settings or running a virtual reality mode related application. In the following embodiment, although the electronic device 220 is set to be mounted in the wearable device 210 to run the virtual reality mode, embodiments of the present disclosure are not limited thereto.

According to an embodiment of the present disclosure, when the electronic device 220 operates in the virtual reality mode (for example, the electronic device 220 is mounted in the wearable device 210 to operate in a head mounted theater (HMT) mode), two screens corresponding to the user's eyes (left and right eye) may be displayed through the display panel 231.

According to an embodiment of the present disclosure, when the electronic device 220 is operated in the virtual reality mode, the controller 240 performs control to process information related to an event generated while operating in the virtual reality mode to fit the virtual reality mode and display the processed information. According to an embodiment of the present disclosure, when the event generated while operating in the virtual reality mode is an event related to running an application, the controller 240 may block the running of the application or process the application to operate as a background process or application.

More specifically, according to an embodiment of the present disclosure, the controller 240 includes at least one of a virtual reality mode processing unit 241, an event determining unit 242, an event information processing unit 243, or an application controller 244 to perform functions according to various embodiments of the present disclosure. An embodiment of the present disclosure may be implemented to perform various operations or functions as described below using at least one component of the electronic device 220 (e.g., the touchscreen 230, controller 240, or storage unit 250).

According to an embodiment of the present disclosure, when the electronic device 220 is mounted in the wearable device 210 or the virtual reality mode is run according to the user's setting or as a virtual reality mode-related application runs, the virtual reality mode processing unit 241 processes various functions related to the operation of the virtual reality mode. The virtual reality mode processing unit 241 may load at least one virtual reality program 251 stored in the storage unit 250 to perform various functions.

The event determining unit 242 can determine an event generated while operated in the virtual reality mode by the virtual reality mode processing unit 241. Further, the event determining unit 242 may determine whether there is information to be displayed on the screen in relation with an event generated while operating in the virtual reality mode. Further, the event determining unit 242 may determine an application to be run in relation with an event generated while operating in the virtual reality mode. Various embodiments of an application related to the type of event are described below.

The event information processing unit 243 can process the event-related information to be displayed on the screen to fit the virtual reality mode when there is information to be displayed in relation with an event occurring while operating in the virtual reality mode depending on the result of determination by the event determining unit 242. Various methods for processing the event-related information may apply. For example, when a three-dimensional (3D) image is implemented in the virtual reality mode, the electronic device 220 may convert the event-related information to fit the 3D image. For example, event-related information being displayed in two dimension (2D) may be converted into information corresponding to the left and right eye corresponding to the 3D image, and the converted information may be synthesized and displayed on the screen of the virtual reality mode being currently run.

When it is determined by the event determining unit 242 that there is an application to be run in relation with the event occurring while operating in the virtual reality mode, the application controller 244 may perform control to block the running of the application related to the event. According to an embodiment of the present disclosure, when it is determined by the event determining unit 242 that there is an application to be run in relation with the event occurring while operating in the virtual reality mode, the application controller 244 may perform control so that the application is run in the background not to influence the running or screen display of the application corresponding to the virtual reality mode when the event-related application runs.

The storage unit 250 may store a virtual reality program 251. The virtual reality program 251 may be an application related to the virtual reality mode operation of the electronic device 220. The storage unit 250 may store the event-related information 252. The event determining unit 242 may reference the event-related information 252 stored in the storage unit 250 to determine whether the occurring event is displayed on the screen or identify information on the application to be run in relation with the occurring event.

The wearable device 210 may be an electronic device including at least one function of the electronic device 101 shown in FIG. 1, and the wearable device 210 may be a wearable stand to which the electronic device 220 may be mounted. In case the wearable device 210 is an electronic device, when the electronic device 220 is mounted on the wearable device 210, various functions may be provided through the communication unit 260 of the electronic device 220. For example, when the electronic device 220 is mounted on the wearable device 210, the electronic device 220 may detect whether to be mounted on the wearable device 210 for communication with the wearable device 210 and may determine whether to operate in the virtual reality mode (or an HMT mode).

According to an embodiment of the present disclosure, upon failure to automatically determine whether the electronic device 220 is mounted when the communication unit 220 is mounted on the wearable device 210, the user may apply various embodiments of the present disclosure by running the virtual reality program 251 or selecting the virtual reality mode (or, the HMT mode). According to an embodiment of the present disclosure, when the wearable device 210 includes functions as the electronic device 101, it may be implemented to automatically determine whether the electronic device 220 is mounted on the wearable device 210 and to enable the running mode of the electronic device 220 to automatically switch to the virtual reality mode (or the HMT mode).

At least some functions of the controller 240 shown in FIG. 2 may be included in the event processing module 180 or processor 120 of the electronic device 101 shown in FIG. 1. The touchscreen 230 or display panel 231 shown in FIG. 2 may correspond to the display 160 of FIG. 1. The storage unit 250 shown in FIG. 2 may correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being in a single touchscreen 230. Further, according to an embodiment of the present disclosure, the electronic device 220 may include the display panel 231 but exclude the touch panel 232.

According to an embodiment of the present disclosure, the electronic device 220 may be denoted as a first device (or a first electronic device), and the wearable device 210 may be denoted as a second device (or a second electronic device) for ease of description.

According to an embodiment of the present disclosure, an electronic device may comprise a display unit displaying a screen corresponding to a virtual reality mode and a controller performing control to detect an interrupt according to occurrence of at least one event, vary event-related information related to the event in a form corresponding to the virtual reality mode, and display the varied event-related information on a screen run corresponding to the virtual reality mode.

According to an embodiment of the present disclosure, the event may include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to an embodiment of the present disclosure, the electronic device further comprises a storage unit storing the event-related information when the event is not an event to be displayed in the virtual reality mode, wherein the controller may perform control to display the event-related information stored in the storage unit when the electronic device switches from the virtual reality mode into a see-through mode.

According to an embodiment of the present disclosure, the electronic device may further comprise a storage unit storing information regarding at least one event to be displayed in the virtual reality mode.

According to an embodiment of the present disclosure, the event may include an instant message reception notification event.

According to an embodiment of the present disclosure, when the event is an event related to running at least one application, the controller may perform control to block running of the application according to occurrence of the event.

According to an embodiment of the present disclosure, the controller may perform control to run the blocked application when a screen mode of the electronic device switches from the virtual reality mode into a see-through mode.

According to an embodiment of the present disclosure, when the event is an event related to running at least one application, the controller may perform control to enable the application according to the occurrence of the event to be run on a background of a screen of the virtual reality mode.

According to an embodiment of the present disclosure, when the electronic device is connected with a wearable device, the controller may perform control to run the virtual reality mode.

According to an embodiment of the present disclosure, the controller may enable the event-related information to be arranged and processed to be displayed in a three dimensional (3D) space of the virtual reality mode screen being displayed on a current screen.

According to an embodiment of the present disclosure, the electronic device may include additional sensors such as one or more frame-based cameras, event-based cameras, 360 degree cameras, other camera types, or a combination thereof.

Figure 3:
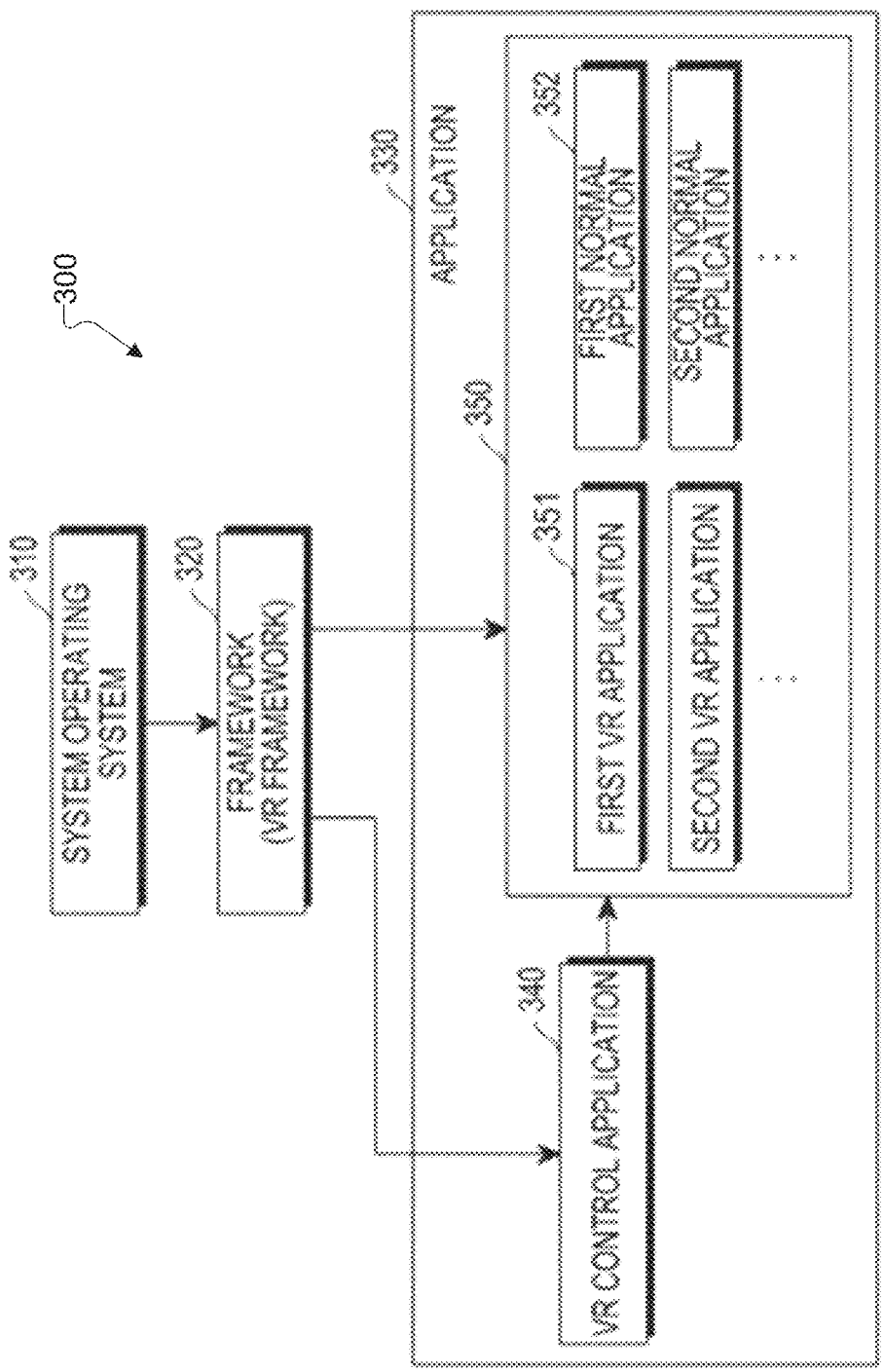
FIG. 3 is a block diagram illustrating a program module according to various embodiments of the present disclosure.

FIG. 3 is a block diagram illustrating a program module 300 according to various embodiments of the present disclosure. The embodiment of the program module 300 shown in FIG. 3 is for illustration only. Other embodiments of the program module 300 could be used without departing from the scope of this disclosure.

Referring to FIG. 3, according to an embodiment of the present disclosure, the program module may include a system operating system (e.g., an OS) 310, a framework 320, an application 330.

The system operating system 310 may include at least one system resource manager or at least one device driver. The system resource manager may perform, e.g., control, allocation, or recovery of system resources, and the system resource manager may include at least one manager, such as a process manager, a memory manager, or a file system manager. The device driver may include at least one driver, such as, e.g., a display driver, a camera driver, a Bluetooth driver, a shared memory driver, a USB driver, a keypad driver, a Wi-Fi driver, an audio driver, or an inter-process communication (IPC) driver.

According to an embodiment of the present disclosure, the framework 320 (e.g., middleware) may provide, e.g., functions commonly required for the application or provide the application with various functions through the API to allow the application to efficiently use limited system resources inside the electronic device.

According to an embodiment of the present disclosure, the VR framework included in the framework 320 may control functions related to virtual reality mode operations on the electronic device. For example, according to running of a virtual reality mode operation, the VR framework 320 may control at least one VR application 351 related to virtual reality among applications 330 to provide the virtual reality mode on the electronic device.

The application 330 may include a plurality of applications and may include at least one VR application 351 running in the virtual reality mode and at least one normal application 352 running in a normal mode, but not the virtual reality mode.

According to an embodiment of the present disclosure, the application 330 may further include a VR control application 340. An operation of the at least one VR application 351 and/or at least one normal application 352 may be controlled under the control of the VR control application 340.

According to an embodiment of the present disclosure, when at least one event occurs while the electronic device operates in the virtual reality mode, the system operating system 310 may notify the framework 320 (e.g., the VR framework) of occurrence of the event.

The framework 320 may control the running of the normal application 352 so that event-related information may be displayed on the screen for the event occurring in the normal mode, but not in the virtual reality mode. When there is an application to be run in relation with the event occurring in the normal mode, the framework 320 may perform control to run at least one normal application 352.

According to an embodiment of the present disclosure, when an event occurs while operating in the virtual reality mode, the framework 320 (e.g., the VR framework) may block the operation of at least one normal application 352 to display the information related to the occurring event. The framework 320 may provide the event occurring while operating in the virtual reality mode to the VR control application 340.

The VR control application 340 may process the information related to the event occurring while operating in the virtual reality mode to fit the virtual reality mode. For example, 2D, planar event-related information may be processed into 3D information.

The VR control application 340 may control at least one VR application 351 currently running and may perform control to synthesize the processed event-related information with the running screen by the VR application 351 and display the result.

According to an embodiment of the present disclosure, when an event occurs while operating in the virtual reality mode, the framework 320 may perform control to block the running of at least one normal application 352 related to the occurring event.

According to an embodiment of the present disclosure, when an event occurs while operating in the virtual reality mode, the framework 320 may perform control to temporarily block the running of at least one normal application 352 related to the occurring event, and when the virtual reality mode terminates, to run the blocked normal application 352.

According to an embodiment of the present disclosure, when an event occurs while operating in the virtual reality mode, the framework 320 may control the running of at least one normal application 352 related to the occurring event so that the at least one normal application 352 related to the event operates on the background so as not to influence the screen by the VR application 351 currently running.

The embodiment described in connection with FIG. 3 is an example for implementing an embodiment of the present disclosure in the form of a program, and embodiments of the present disclosure are not limited thereto and rather may be implemented in other various forms. It should be noted that while reference is made to VR, embodiments described may be applicable in augmented reality, mixed reality, etc.

Figure 4:
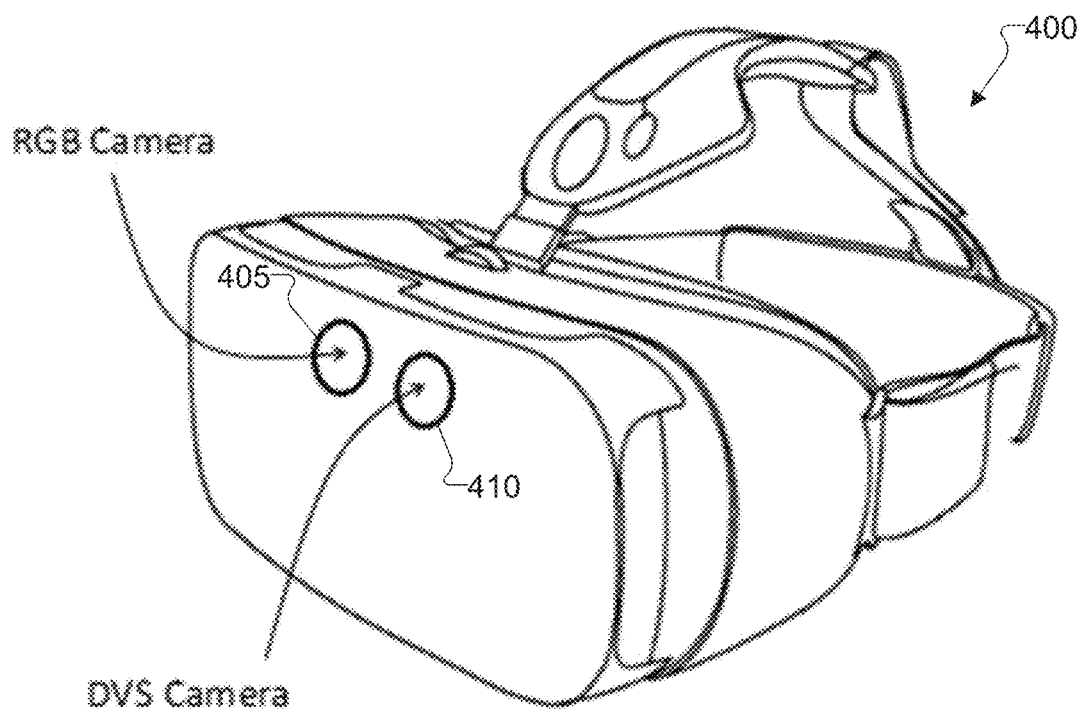
FIG. 4 illustrates an exemplary embodiment of a head mounted display (HMD) for use in augmented reality, virtual reality, mixed reality, and the like, including at least two camera sensors according to the various embodiments of the present disclosure.

FIG. 4 illustrates an exemplary embodiment of a head mounted display (HMD) 400 for use in augmented reality, virtual reality, mixed reality, etc., including at least two camera sensors according to the various embodiments of the present disclosure. The embodiment of the head mounted display (HMD) 400 shown in FIG. 4 is for illustration only. Other embodiments of the head mounted display (HMD) 400 could be used without departing from the scope of this disclosure.

In certain embodiments, the cameras 405, 410 can comprise frame-based cameras, event-based cameras, or a combination as shown. Also, other camera types can be utilized. The HMD can include optional inertial measurement unit (IMU) sensors (e.g., a gyroscope, an accelerometer, etc.). Event-based cameras 410 are vision sensors that output pixel-level brightness changes and can have the characteristics in capturing images at high speeds. Frame-based cameras 405 are vision sensors that produce standard images and can have the characteristics in capturing details of images at lower speeds.

Figure 5:
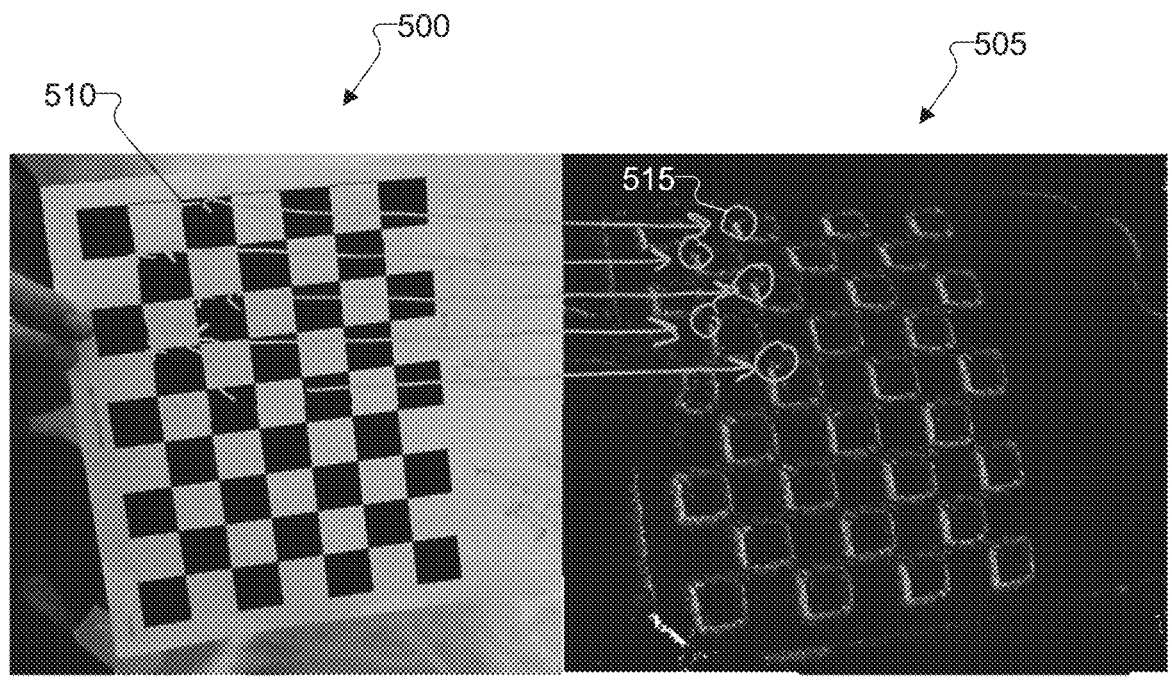
FIG. 5 illustrates a frame from a frame-based camera and an event from an event-based camera according to the various embodiments of the present disclosure.

FIG. 5 illustrates a frame 500 from a frame-based camera and an output 505 from an event-based camera according to the various embodiments of the present disclosure. The embodiment of the frame 500 and the output 505 shown in FIG. 5 are for illustration only. Other embodiments of the frame 500 and the output 505 could be used without departing from the scope of this disclosure.

A frame 500 and relative timestamp are captured using a frame-based camera. Suitable frame-based tracking points 510 are located within the frame 500. For each frame-based tracking point 510, a relative (x,y) position is determined. For example, if the sample frame width is 640 pixels, and a frame-based tracking point 510 is in the middle of that frame at 320 pixels, then the x value of that frame-based tracking point 510 is 50%. The x value of the frame-based tracking point 510 can also be expressed as 50, 0.5, or any other suitable value representing 50%. The same expression used for the x value(s) is also used with y value(s) for the frame-based tracking point(s) 510.

An output 505 with corresponding timestamp is created from an event-based camera. For each frame-based tracking point 510 identified from the frame 500, a test for a cluster or event-based tracking point 515 is done in the same area of the output 505 to determine if the corresponding frame-based tracking point 510 is useable. To make this determination, the cluster size of the reported events and the clarity of the cluster 515 are examined. This cluster 515 is tested over a number of outputs 505 to insure consistency. If the cluster 515 is determined to be trackable, the cluster 515 and relative frame-based tracking point 510 are locked. This continues until all frame-based tracking points 510 have been tested.

The event-based camera may typically run many times faster than the frame-based camera in one example the event-based camera may run 10 times faster than a frame-based camera. This ratio can be set by the programmer to determine how fast the frame-based and event-based cameras will run. Based on this setting, at every frame, a check may be made to insure the tracking points from the frame-based and event-based cameras are still consistent.

If enough tracking points are determined consistent, head pose (localization) can be calculated from frame-based camera data and event-based camera data independently.

The head pose from each camera should be congruent. Based on the congruency, each output 'frame' may be used used to calculate head pose until the next frame is generated. Then the correlation tests are repeated. Depending on consistent correlation, the frequency of the frame-based camera frames can be adjusted to save on resources.

Figure 6:
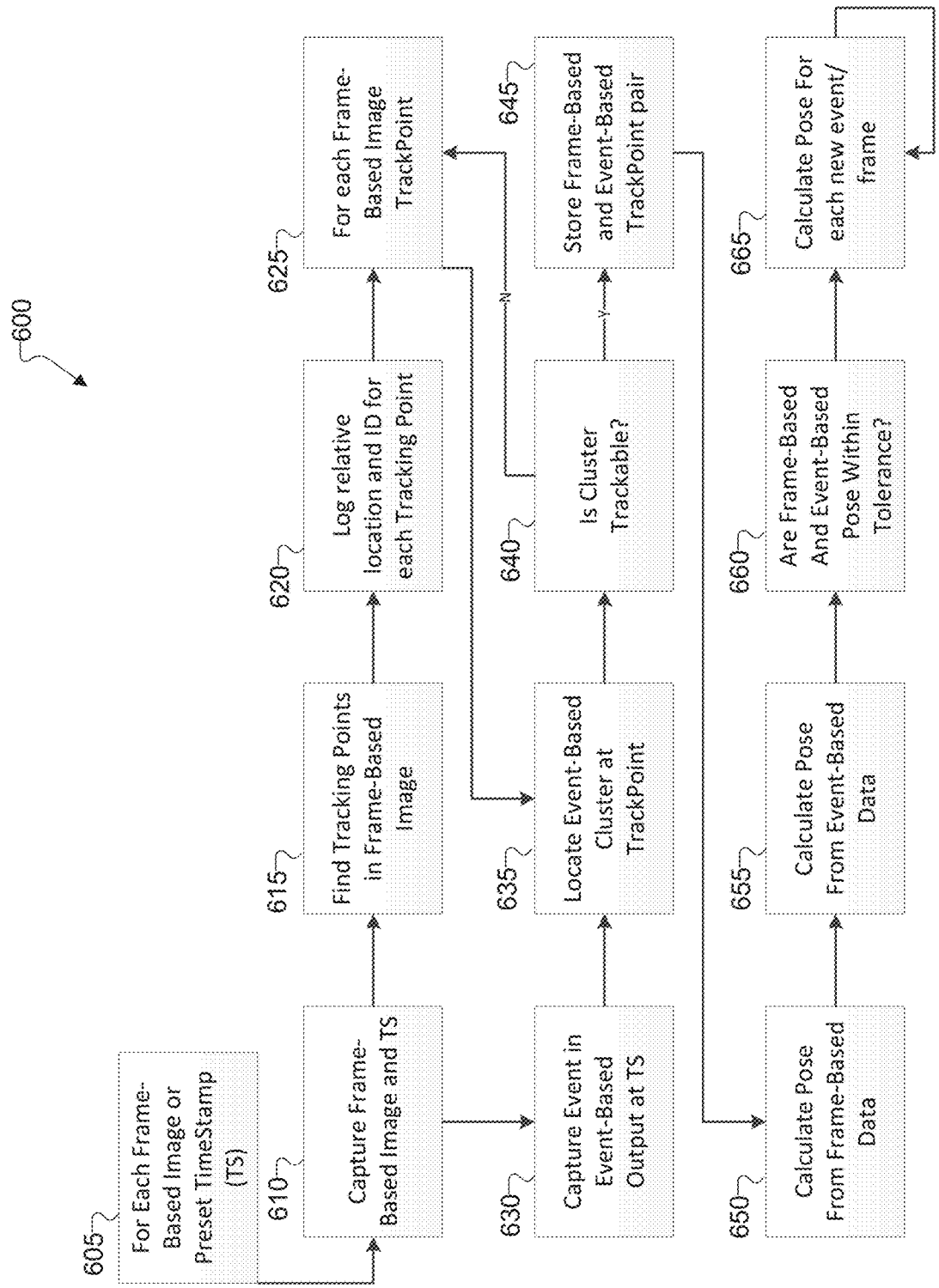
FIG. 6 illustrates an exemplar flow diagram for synchronizing a frame-based camera and an event-based camera for determining a pose of a head mounted device according to the various embodiments of the present disclosure.

FIG. 6 illustrates an exemplar flow diagram 600 for synchronizing a frame-based camera and an event-based camera for determining a pose of a head mounted device according to the various embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 6 can be performed by the HMD 400 in FIG. 4. The process can also be implemented by the electronic device 220 in FIG. 2.

In operation 605, the electronic device 220 performs the operations 610-665 for each frame-based image or preset time stamp.

In operation 610, the electronic device 220 captures a frame-based image and corresponding time stamp. The electronic device 220 can receive frame-based data captured by the frame-based camera.

In operation 615, the electronic device 220 identifies tracking points in the frame-based image. The electronic device 220 can identify a frame-based tracking point from the frame-based data.

In operation 620, the electronic device 220 logs a relative location and ID for each identified tracking point. Each tracking point corresponds to a relative x value and a relative y value in the frame.

In operation 625, the electronic device 220 selects one of the tracking points for comparison with an event-based output. The tracking point can be selected based on location in the frame, clarity or strength of the tracking point, etc.

In operation 630, the electronic device 220 captures, simultaneously with operation 610, an event-based output at the time stamp. The electronic device 220 can receive event-based data captured by the event-based camera. The event-based data can include a plurality of event-based tracking points or clusters. The output of the event-based tracking point and the frame of the frame-based tracking point can have a same time stamp.

In operation 635, the electronic device 220 locates a cluster corresponding to the tracking point. The electronic device 220 can identify a cluster or event-based tracking point from the event-based data corresponding to the frame-based tracking point.

In operation 640, the electronic device 220 determines whether the cluster is trackable. The electronic device 220 determines a quality of each event-based tracking point of the plurality of event-based tracking points compared to the frame-based tracking point. The electronic device 220 can rank the plurality of event-based tracking points and select the identified event-based tracking point as a highest ranked tracking point of the plurality of ranked event-based tracking points for use in head pose tracking. The rank of the event-based tracking point can include a stability of an output, a clarity of the event-based tracking point, and a lack of neighboring tracking points.

In operation 645, the electronic device 220 stores the tracking point of the frame and the cluster of the output as a pair. The pair of the tracking point and the cluster are used in future frames and outputs to determine motion in the pose of the user.

In operation 650, the electronic device 220 calculates a frame pose from the frame-based data. The frame-based pose is determined from the frame-based data.

In operation 655, the electronic device 220 calculates an event pose from the event-based data. The event-based pose is determined from the event-based data.

In operation 660, the electronic device 220 determines whether the frame pose and the event pose are within an acceptable tolerance level. The electronic device monitors the frame-based pose and the event-based pose to be within a tolerance.

In operation 665, the electronic device 220 calculates a pose for each event frame that is received. The electronic device 220 can synchronize the frame-based camera and the event-based camera based on the identified frame-based tracking point and the identified event-based tracking point.

In certain embodiments, the event-based camera captures a second output before the frame-based camera captures a second frame. The electronic device 220 identifies a second event-based tracking point from the event-based data corresponding to the second output. The second event-based tracking point corresponds to the first event-based tracking point captured at the earlier time stamp with the corresponding frame. The electronic device 220 synchronizes the frame-based camera and the event-based camera based on the identified frame-based tracking point and the identified second event-based tracking point.

Figure 7:
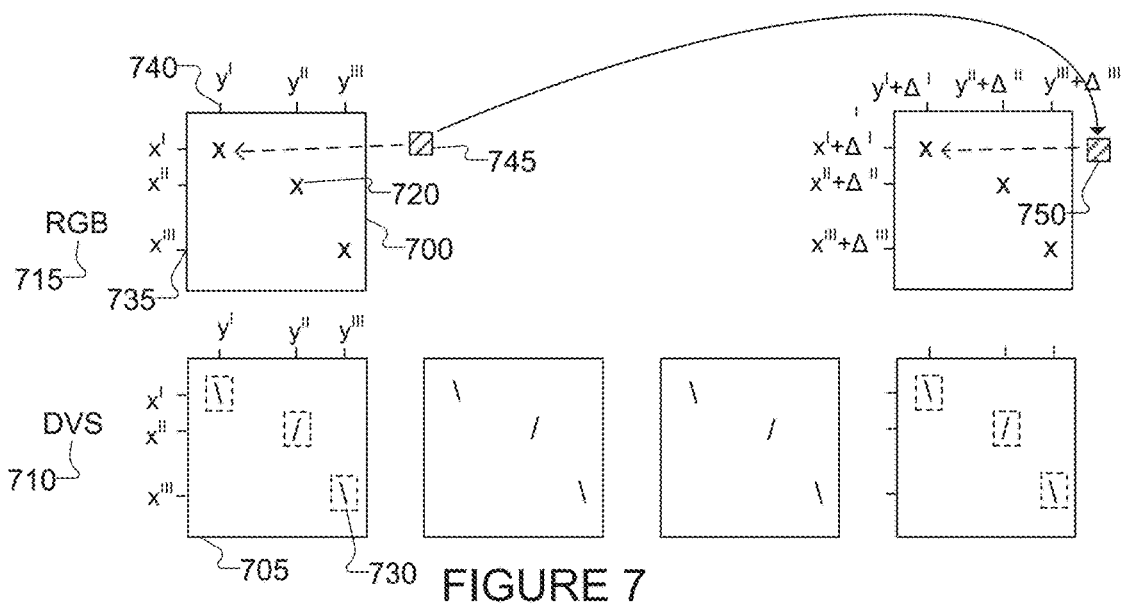
FIG. 7 illustrates a symbiotic sensor fusion of a low resolution camera, a high resolution camera, and an inertial motion unit (IMU) according to the various embodiments of the present disclosure.

FIG. 7 illustrates exemplary frame-based tracking points in a frame 700 and event-based tracking points in an output 705 across an amount of time according to the various embodiments of the present disclosure. The embodiment of the frame 700 and output 705 shown in FIG. 7 are for illustration only. Other embodiments of the frame 700 and output 705 could be used without departing from the scope of this disclosure.

The frame-based camera 715 captures the frame 700. A number of tracking points 820 are identified in the frame 700. The event-based camera 710 captures the output 705. A number of clusters 730, or event-based tracking points, are identified in the output 705.

A relative x value 735 and a relative y value 740 are associated with each tracking point 720. The clusters 730 that correspond to the relative x value 735 and relative y value 740 are matched to the tracking point 720. A tracking point 720 that corresponds to a cluster 730 is a selected tracking point 745. The selected tracking point 745 is compared to the corresponding cluster 730 for movement between frame captures. The later tracking point 750 is compared to the selected tracking point 745 to determine movement of the pose.

Figure 8:
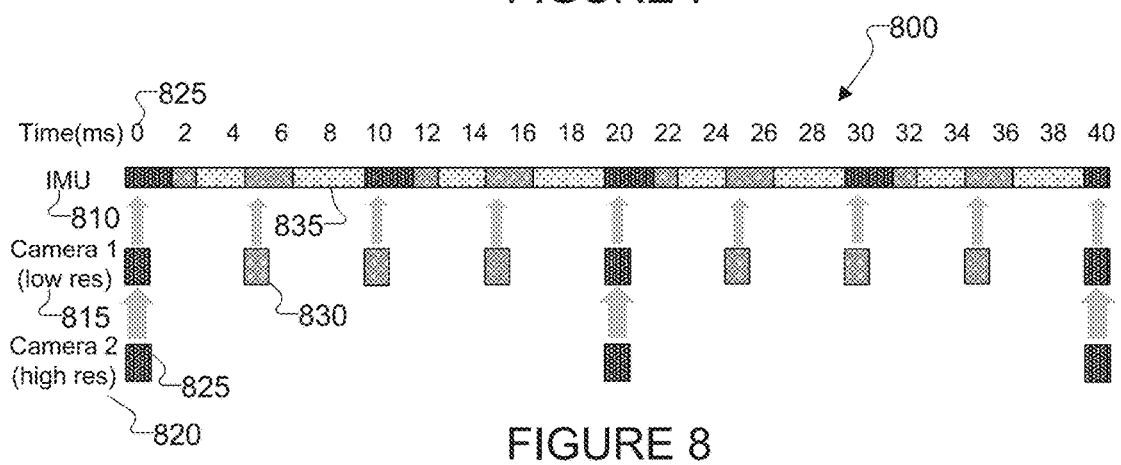
FIG. 8 illustrates exemplary frame-based tracking points in a frame and event-based tracking points in an event across an amount of time according to the various embodiments of the present disclosure.

FIG. 8 illustrates an exemplary symbiotic sensor fusion 800 of a low resolution camera, a high resolution camera, and an inertial motion unit (IMU) according to the various embodiments of the present disclosure. The embodiment of the symbiotic sensor fusion 800 shown in FIG. 8 is for illustration only. Other embodiments of the symbiotic sensor fusion 800 could be used without departing from the scope of this disclosure.

FIG. 8 illustrates sensor samples over time and their accuracy along with how the lower/less accurate sensors are recalibrated with the higher accuracy sensor samples in accordance with an embodiment of the invention. For example, symbiotic sensor fusion 800 shows an embodiment with an IMU 810, a first camera 815, and a second camera 820. The first camera 815 can be a low resolution camera. The second camera 820 can be a high resolution camera. The first camera 815 can operate at a higher framerate than the second camera 820. Optionally, the cameras can be of different types (e.g., the first camera 815 can be an event-based camera (e.g., a DVS camera) while the second camera 820 can be a frame-based camera (e.g. an RGB camera)). As shown in the figure below, the IMU 810 can continuously run. However, the IMU 810 can lose accuracy over time (as exemplified from its transition high accuracy 825 at 0 and 1 ms to moderate accuracy 830 at 2 ms to low accuracy 835 at 3 and 4 ms). Similar accuracy loss can be experienced with the low resolution camera or optical sensor. The accuracy loss for the low resolution camera can be less than the accuracy loss of the IMU 810. When input comes in from the low resolution camera 815, the IMU 810 can be recalibrated according to the low resolution camera (as shown by the accuracy increase to orange at 5 and 6 ms). Similarly, when input from the high resolution camera 820 is received, the other sensors (e.g., low resolution camera 815 and IMU 810) can be recalibrated according to the high resolution camera (as shown by the recalibration to high accuracy 825 for both the IMU 810 and low resolution camera 815 at 20 ms).

Figure 9:
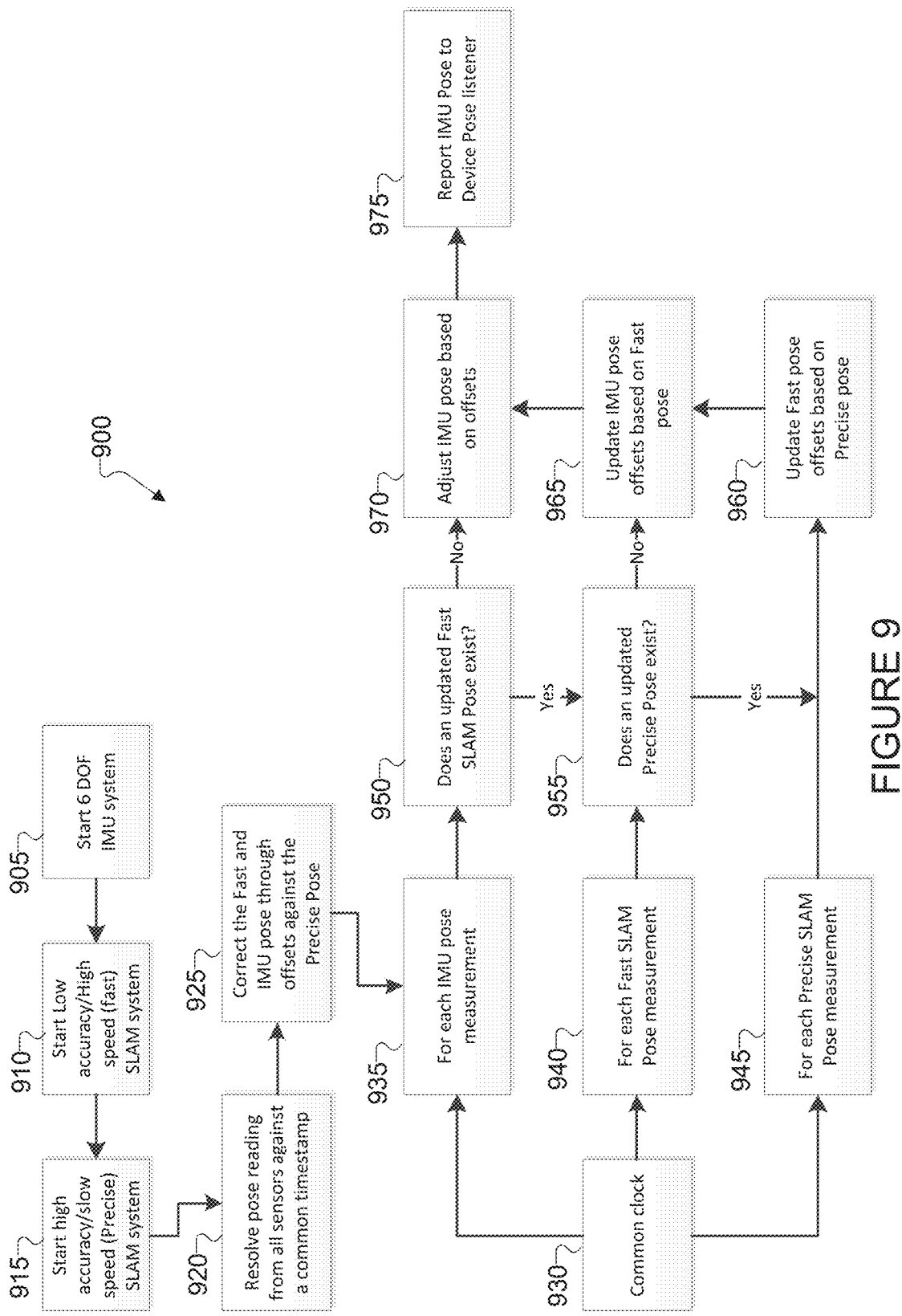
FIG. 9 illustrates an exemplary flow diagram for utilizing the information from the cameras based on sensed motion speed of the headset according to the various embodiments of the present disclosure.

FIG. 9 illustrates an exemplary flow diagram showing a method to employ a combination of head pose tracking techniques to enhance each technique while minimizing the technique's limitations. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 9 can be performed by the HMD 400 in FIG. 4. The process can also be implemented by the electronic device 220 in FIG. 2. The method can utilize a system or electronic device, such as an HMD, with an IMU and at least one optical sensor.

In operation 905, the electronic device 220 can include a single frame-based camera that switches between high quality and low quality samples and a 6 degree of freedom (DOF) IMU. In another embodiment, multiple optical sensors can be utilized of different types (e.g., RGB and/or DVS) and be mounted HMD with at least a 6 DOF sensor.

In operation 910, the electronic device 220 operates an event-based camera that tracks head pose at a very high rate, and with far less computational data, but is less accurate due to the nature of the event-based sensor.

In operation 915, the electronic device 220 operation a frame-based sensor is operating at a high resolution but low framerate, which can give accurate head position and transformation, but not fast enough to support computer vision requirements. An at least 6 DOF (or greater) IMU can track at a very high rate with very little computation requirement, but is very noisy and can be extremely inaccurate over even small sample periods.

The tracking points used by the frame-based camera and located by the event-based camera and are tracked. Running at a lower resolution (as with frame-based) or different type of optical tracking (as with DVS) a higher framerate is achieved. With each derived solution based on the high accuracy optical solution, the lower quality optical solution is corrected. This same relationship is repeated from the faster optical solution to the IMU only solution.

In an embodiment of the disclosure, other image sensors that achieve high frame rates at low computational costs can be utilized (e.g., DVS, IR DVS, etc.).

In operation 920, the electronic device 220 resolves pose reading from all sensors against a common time stamp. In operation 925, the electronic device 220 corrects the Fast and IMU pose through offsets against the precise pose.

In operation 930, the electronic device 220 uses a common clock to determine the time stamps. In operation 935, the electronic device 220 determines an IMU pose measurement for the common time stamp. In operation 940, the electronic device 220 determines a fast SLAM pose measurement for the common time stamp. In operation 945, the electronic device 220 determines a precise SLAM pose measurement for the common time stamp.

In operation 950, the electronic device 220 determines whether an updated fast SLAM pose exists. In operation 950, the electronic device 220 determines, if an updated fast SLAM pose exists at the common time stamp, whether an updated precise pose exists.

In operation 960, the electronic device 220 updates, if an updated precise SLAM pose exists at the common time stamp, the fast pose offsets based on the precise pose. In operation 965, the electronic device 220 updates, if an updated precise SLAM pose does not exists at the common time stamp, an IMU pose offsets based on the fast pose. In operation 90, the electronic device 220 adjusts, if an update fast SLAM pose does not exist, the IMU pose based on offsets in the IMU pose measurement. In operation 975, the electronic device 220 reports the IMU pose to a device pose listener.

Figure 10:
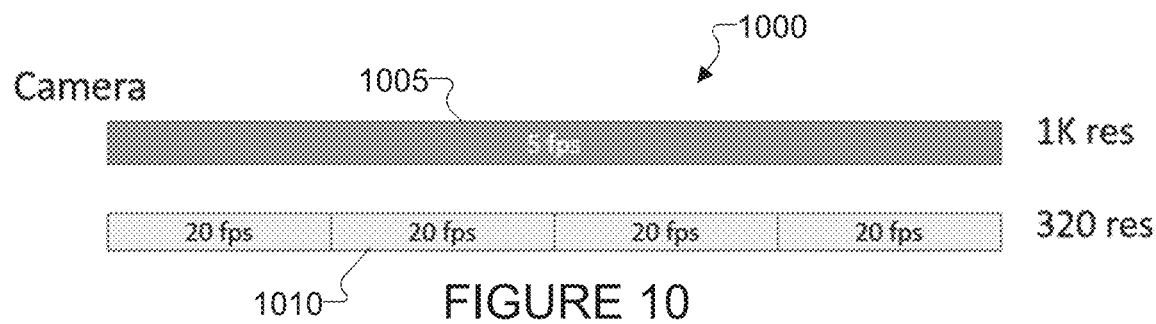
FIG. 10 illustrates an exemplary a camera operating using multiple frame rates according to the various embodiments of the present disclosure.

FIG. 10 illustrates an exemplary illustration of operating one or more sensors using multiple frame rates according to the various embodiments of the present disclosure. In one embodiment of a single camera 1000 shown in FIG. 10 is for illustration only. Other embodiments of which may utilize multiple cameras 1000 could be used without departing from the scope of this disclosure.

In certain embodiments, two optical sensors 1005, 1010 are mounted in a HMD 1000 with at least a 6 DOF sensor (IMU). A 6 degree of freedom (or better) IMU can track at a very high rate with very little computation requirement, but is very noisy and can be extremely inaccurate over even small sample periods.

The optical sensors 1005, 1010 may be the same type (e.g., two frame-based cameras at different resolutions) or the optical sensors may be of different types (e.g., one frame-based camera and one event-based camera).

One sensor 1005 is operating at a high resolution but low framerate, which give accurate head position and transformation, but not fast enough to support computer vision requirements.

The other sensor 1010 operating at a low resolution but high framerate. This can track head pose at a very high rate, and with far less computational data, but is less accurate. As indicated, this can also be a different type of camera so running at a lower resolution or different type of optical tracking a higher framerate is achieved.

In one embodiment, the single camera may utilize a single sensor but adjust between different resolutions: a lower resolution with a faster framerate and a higher resolution with a slower framerate. The operation may be similar to the multiple optical sensors described above. The embodiments described in FIG. 10 with respect to the IMU may operate in a similar fashion as described in FIG. 8.

Figure 11:
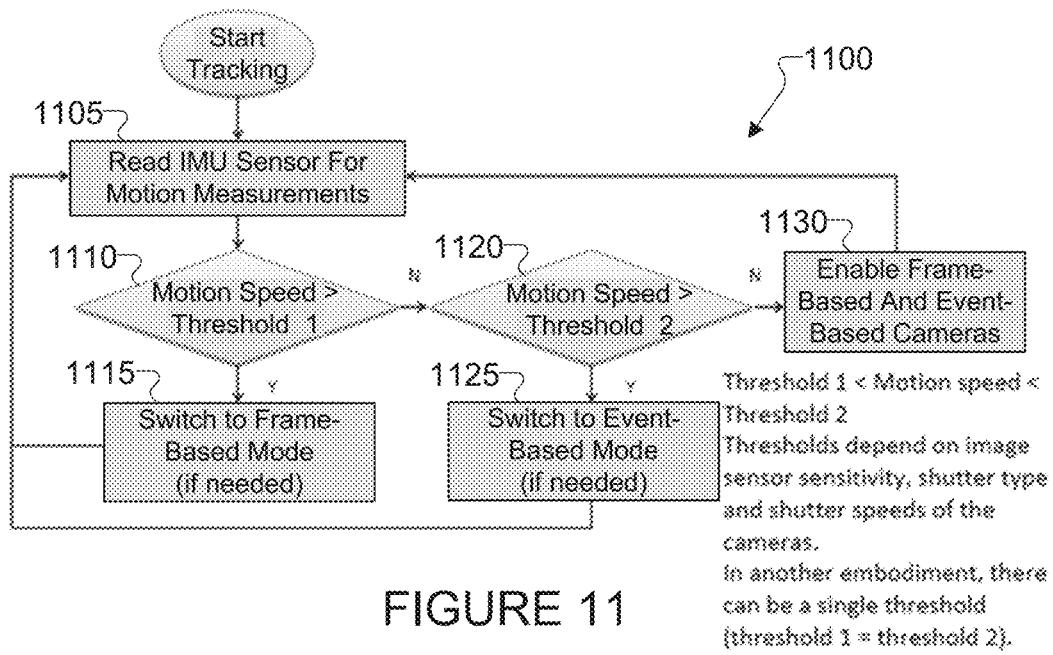
FIG. 11 illustrates exemplary flow diagrams for various conditions for adjusting an optical tracking rate based on head pose change according to the various embodiments of the present disclosure.

FIG. 11 illustrates an exemplary flow diagram 1100 for utilizing the information from the cameras based on sensed motion speed of the headset according to the various embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 11 can be performed by the HMD 400 in FIG. 4. The process can also be implemented by the electronic device 220 in FIG. 2.

In operation 1105, the HMD 400 can begin tracking and read the information from the IMU sensor(s) for motion measurements.

In operation 1110, the HMD 400 can make a decision whether the motion speed is less than a first threshold.

In operation 1115, the HMD 400 can switch, if the motion speed is below a first threshold, to a frame-based mode (e.g., only obtain or utilize image information from the frame-based camera), then return to reading IMU sensor(s) for motion measurement.

In operation 1120, the HMD 400 can check, if the motion speed is greater than a first threshold, the motion speed against a second threshold.

In operation 1125, the HMD 400 can switch, if the motion speed is greater than the second threshold, to an event-based mode (e.g., only obtain or utilize image information from the event-based camera), then return to reading IMU sensor(s) for motion measurement.

In operation 1130, the HMD 400 can enable, if the motion speed is determined to be equal or between the two thresholds, both frame-based and event-based cameras and can obtain or utilize image information from both.

In certain embodiments, the thresholds can depend on characteristics of the image sensors or cameras, such as sensitivity, shutter type, shutter speeds, etc. In another embodiment, the thresholds can equal each other.

Figure 12:
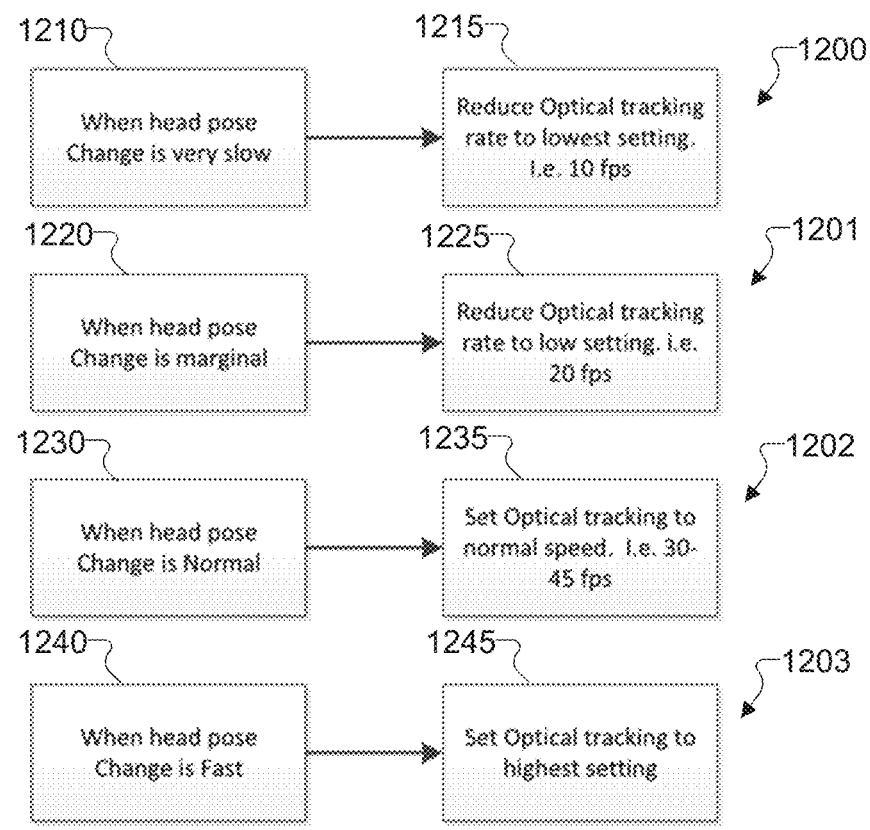
FIG. 12 illustrates an exemplary process flow diagram showing a method to employ a combination of head pose tracking techniques to enhance each technique while minimizing the technique's limitations according to the various embodiments of the present disclosure.

FIG. 12 illustrates exemplary process flow diagrams 1200, 1201, 1202, 1203 for various conditions for adjusting an optical tracking rate based on head pose change according to the various embodiments of the present disclosure. While the flow charts depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in FIG. 12 can be performed by the HMD 400 in FIG. 4. The process can also be implemented by the electronic device 220 in FIG. 2.

As indicated in the embodiment described in FIG. 4, the IMU can detect changes in the head pose (e.g., amount and rate of user head movement). If the head pose change is considered very slow or non-existent (1210), the optical tracking rate can be reduced to the lowest setting (e.g., 10 frames per second (FPS)) (1215). If the head pose change is considered marginal or some movement is occurring (1220), the optical tracking rate can be set to a low setting (e.g., 15-25 FPS) (1225). If the head pose change is considered normal (1230), the optical tracking rate can be set to a normal speed (e.g., 30-45 FPS) (1235). If rapid head pose changes are detected (1240), the optical tracking can be set to the maximum setting (e.g., 50 FPS or greater) (1245). While the FIG. 12 illustrates four categories for head pose change, any granularity of categories or thresholds can be utilized. Additionally, the frames per second for each category are exemplary and can be further adjusted based on granularity.

Although FIGS. 6, 9 and 11 illustrates example processes, various changes could be made to FIGS. 6, 9 and 11. For example, while shown as a series of steps, various steps in each figure could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device for tracking point synchronization comprising:
   a frame-based camera;
   an event-based camera; and
   a processor coupled to the frame-based camera and the event-based camera, the processor configured to:
      receive frame-based data captured by the frame-based camera and event-based data captured by the event-based camera;
      identify a frame-based tracking point from the frame-based data;
      identify an event-based tracking point from the event-based data corresponding to the frame-based tracking point; and
      synchronize the frame-based camera and the event-based camera based on the identified frame-based tracking point and the identified event-based tracking point.

2. The electronic device of claim 1, wherein:
   the event-based data includes a plurality of event-based tracking points,
   the processor is further configured to:
      determine a quality of each event-based tracking point of the plurality of event-based tracking points compared to the frame-based tracking point;
      rank the plurality of event-based tracking points;
      select the identified event-based tracking point as a highest ranked tracking point of the plurality of ranked event-based tracking points for use in head pose tracking.

3. The electronic device of claim 2, wherein a rank of the event-based tracking point includes a stability of an output, a clarity of the event-based tracking point, and a lack of neighboring tracking points.

4. The electronic device of claim 1, wherein:
   the frame-based data includes a frame and a corresponding frame time stamp;
   the event-based data includes an output and a corresponding output time stamp; and
   the output time stamp for the output corresponding to the event-based tracking point is synchronized with the frame time stamp for the frame corresponding to the frame-based tracking point.

5. The electronic device of claim 1, wherein the processor is further configured to:
   determine a frame-based pose from the frame-based data;
   determine an event-based pose from the event-based data; and
   monitor the frame-based pose and the event-based pose to be within a tolerance.

6. The electronic device of claim 5, wherein the event-based camera captures a second output before the frame-based camera captures a second frame.

7. The electronic device of claim 6, wherein the processor is further configured to:
identify a second event-based tracking point from the event-based data corresponding to the second event; and
synchronize the frame-based camera and the event-based camera based on the identified frame-based tracking point and the identified second event-based tracking point.

8. A method for operating an electronic device for tracking point synchronization comprising:
receiving frame-based data captured by a frame-based camera and event-based data captured by an event-based camera;
identifying a frame-based tracking point from the frame-based data;
identifying an event-based tracking point from the event-based data corresponding to the frame-based tracking point; and
synchronizing the frame-based camera and the event-based camera based on the identified frame-based tracking point and the identified event-based tracking point.

9. The method of claim 8, wherein the event-based data includes a plurality of event-based tracking points, and further comprising:
determining a quality of each event-based tracking point of the plurality of event-based tracking points compared to the frame-based tracking point;
ranking the plurality of event-based tracking points; and
selecting the identified event-based tracking point as a highest ranked tracking point of the plurality of ranked event-based tracking points for use in head pose tracking.

10. The method of claim 9, wherein a rank of the event-based tracking point includes a stability of an output, a clarity of the event-based tracking point, and a lack of neighboring tracking points.

11. The method of claim 8, wherein:
the frame-based data includes a frame and a corresponding frame time stamp;
the event-based data includes an output and a corresponding output time stamp; and
the output time stamp for the output corresponding to the event-based tracking point is synchronized with the frame time stamp for the frame corresponding to the frame-based tracking point.

12. The method of claim 8, further comprising:
determining a frame-based pose from the frame-based data;
determining an event-based pose from the event-based data; and
monitoring the frame-based pose and the event-based pose to be within a tolerance.

13. The method of claim 12, wherein the event-based camera captures a second output before the frame-based camera captures a second frame.

14. The method of claim 13, further comprising:
identifying a second event-based tracking point from the event-based data corresponding to the second output; and
synchronizing the frame-based camera and the event-based camera based on the identified frame-based tracking point and the identified second event-based tracking point.

15. A non-transitory computer readable medium embodying a computer program, the computer program comprising computer readable program code that when executed causes at least one processor to:
receive frame-based data captured by a frame-based camera and event-based data captured by an event-based camera;
identify a frame-based tracking point from the frame-based data;
identify an event-based tracking point from the event-based data corresponding to the frame-based tracking point; and
synchronize the frame-based camera and the event-based camera based on the identified frame-based tracking point and the identified event-based tracking point.

16. The non-transitory computer readable medium of claim 15, wherein:
the event-based data includes a plurality of event-based tracking points, and
the computer readable program code that when executed further causes at least one processor to:
determine a quality of each event-based tracking point of the plurality of event-based tracking points compared to the frame-based tracking point;
rank the plurality of event-based tracking points; and
select the identified event-based tracking point as a highest ranked tracking point of the plurality of ranked event-based tracking points for use in head pose tracking.

17. The non-transitory computer readable medium of claim 16, wherein a rank of the event-based tracking point includes a stability of an output, a clarity of the event-based tracking point, and a lack of neighboring tracking points.

18. The non-transitory computer readable medium of claim 15, wherein:
the frame-based data includes a frame and a corresponding frame time stamp;
the event-based data includes an output and a corresponding output time stamp; and
the output time stamp for the output corresponding to the event-based tracking point is synchronized with the frame time stamp for the frame corresponding to the frame-based tracking point.

19. The non-transitory computer readable medium of claim 15, wherein the computer readable program code that when executed further causes at least one processor to:
determine a frame-based pose from the frame-based data;
determine an event-based pose from the event-based data; and
monitor the frame-based pose and the event-based pose to be within a tolerance.

20. The non-transitory computer readable medium of claim 19, wherein:
the event-based camera captures a second output before the frame-based camera captures a second frame, and
the computer readable program code that when executed further causes at least one processor to:
identify a second event-based tracking point from the event-based data corresponding to the second output; and synchronize the frame-based camera and the event-based camera based on the identified frame-based tracking point and the identified second event-based tracking point.

21. A device for tracking point synchronization comprising:
an inertial motion unit (IMU), configured to generate motion data based on an HMD movement;
at least one optical sensor; and
a processor coupled to the IMU and the at least one optical sensor, the processor configured to execute instructions to:
receive data from the IMU;
receive low resolution data and high resolution data at different framerates from the at least one optical sensor;
check whether data is available from a more precise source for each data point received;
update an offset for a less precise data source based on the more precise source when available; and
determine pose based on the updated offset.

22. A head mounted display (HMD) comprising:
an inertial motion unit (IMU), configured to generate motion data based on an HMD movement;
at least one outward facing optical sensor coupled to the HMD;
a processor coupled to the IMU and the at least one optical sensor, the processor configured to execute instructions to:
receive motion data from the IMU;
determine rate of pose change of the HMD based on the received motion data; and
adjust an optical tracking rate from the outward facing optical sensor based on the determined rate of pose change.

23. The HMD of claim 22, further comprising:
a memory couple to the processor; and
wherein to adjust the optical tracking rate from the outward facing optical sensor based on the determined rate of pose change further comprises instructions executable by the processor to:
store in a circular buffer in the memory, input from the outward facing optical sensor; and;
perform pose calculations from the input of the outward facing optical sensor stored in the circular buffer at a calculation rate based on the determined rate of pose change.

24. The HMD of claim 22, wherein:
the at least one outward facing optical sensor comprises an adjustable frame rate; and
to adjust the optical tracking rate from the outward facing optical sensor based on the determined rate of pose change further comprises instructions executable by the processor to:
adjust the adjustable frame rate of the at least one outward facing optical sensor based on the determined rate of pose change.

25. A head mounted display (HMD) comprising:
an outward facing frame-based camera coupled to the HMD;
an outward facing event-based camera coupled to the HMD in proximity to the frame-based camera;
an inertial motion unit (IMU), configured to generate motion data based on an HMD movement; and
a processor coupled to the frame-based camera, the event-based camera, and the IMU, the processor configured to execute instructions to:
receive motion data from the IMU;
select at least one of the frame-based camera or the event-based camera based on the motion data;
receive image data from the selected camera; and
process received image data to determine an HMD orientation.

* * * * *